Nov. 26, 1946.   A. F. McMAHON   2,411,833
REFRIGERATING APPARATUS
Filed July 3, 1943   3 Sheets—Sheet 1

INVENTOR.
Alexander F. McMahon
BY
Atty.

Nov. 26, 1946.  A. F. McMAHON  2,411,833
REFRIGERATING APPARATUS
Filed July 3, 1943  3 Sheets-Sheet 2

INVENTOR.
Alexander F. McMahon
BY
[signature]
Atty.

Nov. 26, 1946.   A. F. McMAHON   2,411,833
REFRIGERATING APPARATUS
Filed July 3, 1943   3 Sheets-Sheet 3
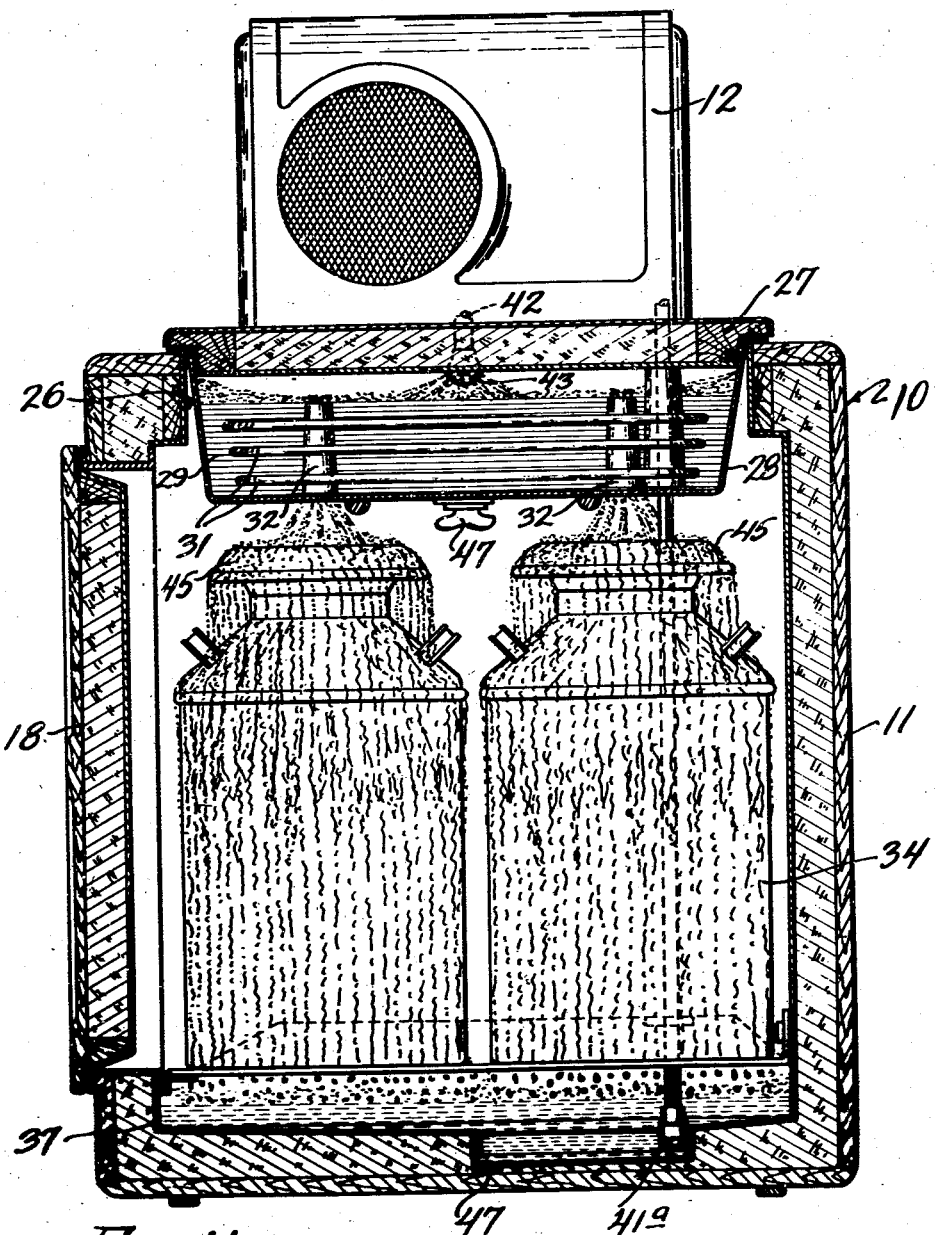

Patented Nov. 26, 1946

2,411,833

UNITED STATES PATENT OFFICE 2,411,833

REFRIGERATING APPARATUS

Alexander F. McMahon, Oak Park, Ill., assignor to The Bastian-Blessing Company, Chicago, Ill., a corporation of Illinois Application July 3, 1943, Serial No. 493,369

10 Claims. (Cl. 62—141)

This invention relates to the method of and apparatus for cooling or refrigerating food products, and the like.

One of the objects of the invention is the provision of a new and improved apparatus for rapidly reducing the temperature of food products, and especially the temperature of beverages, such as fresh milk, and the like, contained in receptacles.

Another object of the invention is the provision of new and improved apparatus for efficiently and promptly cooling milk after the milking operation.

Another object of the invention is to improve the sanitation and method of removing body heat from milk without exposing the milk to contamination.

A further object of the invention is the provision of a new and improved refrigerating apparatus that has a reserve cooling power whereby peak loads requiring high capacity refrigeration may be accommodated by an apparatus having a comparatively low cooling capacity.

A still further object of the invention is the provision of a new and improved cooling system having means for storing refrigeration or the cooling effect during light loads and using the same at peak loads; that is simple in construction; inexpensive to manufacture; efficient in operation; composed of few moving parts; and one that is not likely to become deranged or get out of order.

Other and further objects and advantages of the invention will appear from the following description, taken in connection with the accompanying drawings in which Fig. 1 is a front elevation of a cooling or refrigerating apparatus embodying the invention;

Fig. 4 is a view similar to Fig. 3, but showing the device in operation for rapidly cooling a food product.

Figure 2:
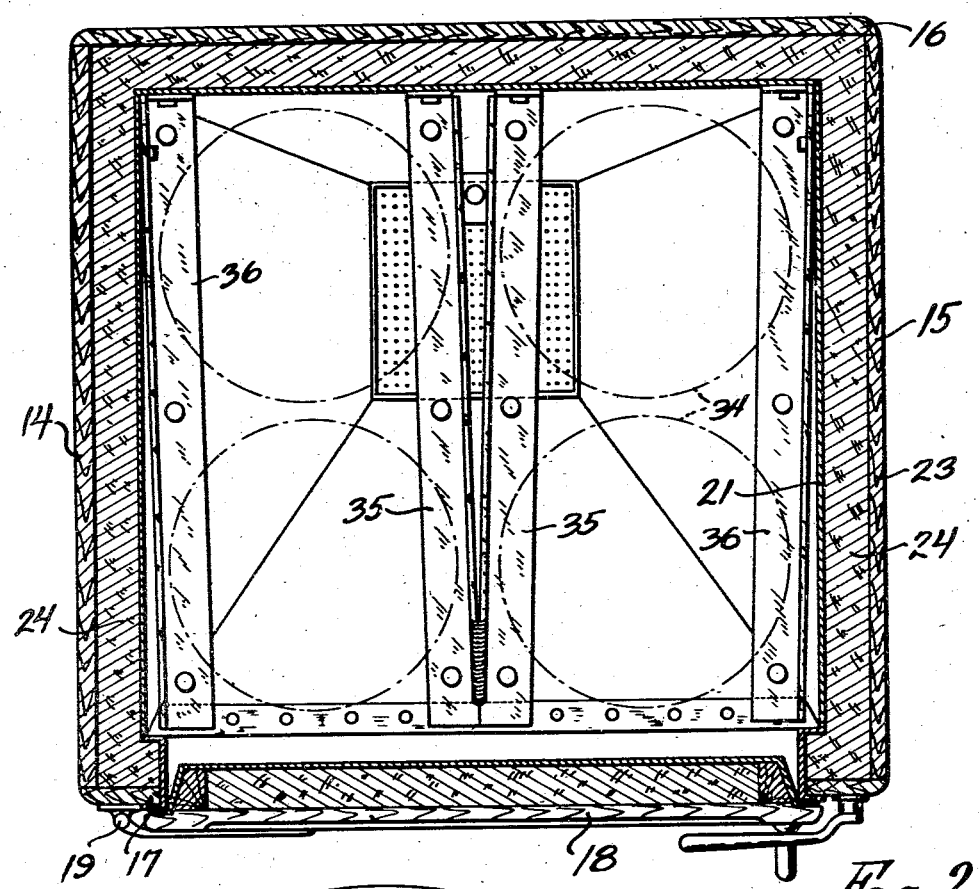
Fig. 2 is a horizontal section on the line 2—2 of Fig. 1.
Figure 1:
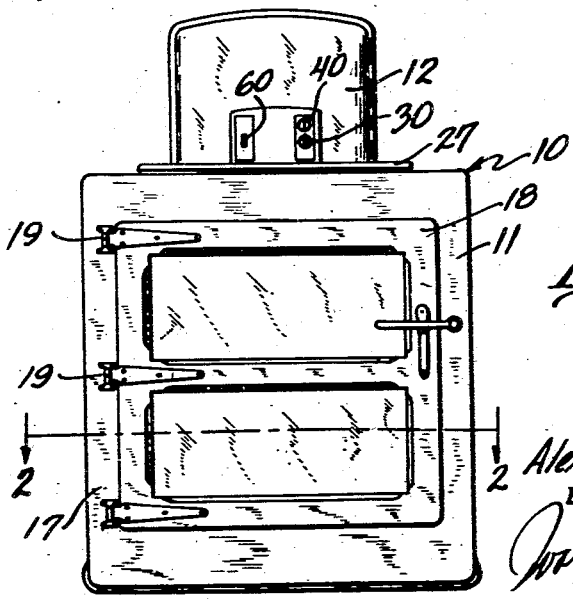

In certain classes of work, or in certain occupations, the use of cooling apparatus is essential, if not absolutely necessary, and to complicate the matter there are peak loads that must be provided for where heat exchange has to be completed rapidly. In the dairy business, for instance, milking occurs but twice a day, usually in the early morning and in the late afternoon or evening. Because of the rapid growth of bacteria in milk containing animal heat, many states have regulations requiring the cooling of the freshly drawn milk within a very short time to a predetermined temperature. Since this cooling operation is accomplished in a very few minutes, it has heretofore been necessary for the dairyman to have a copious supply of cool running water, or be provided with a refrigerator having a very large capacity. Either of these methods of cooling the milk is more or less impractical, due either to the lack of cool water or the added cost in operating a large refrigerator. Moreover, in order to accomplish the cooling rapidly the milk heretofore has been cascaded over cooler coils in contact with the air and subject to contamination.

The present invention seeks to eliminate these difficulties by the provision of a small capacity refrigerator, and by providing means in the refrigerator for what will be termed storing refrigeration, or the cooling effect in the formation of ice, during the portion of the day or night when the milk is not actually being cooled, to be utilized at the proper time in the rapid cooling of the milk through heat exchange between liquids. The latent heat of fusion of the ice is especially important in this relation, because it permits the apparatus to be so constructed as to occupy a minimum of space and yet store up a large amount of refrigeration in the ice.

Referring now to the drawings, the reference character 10 designates, generally, the refrigerator or cooling apparatus, which comprises a cabinet 11 on which is mounted a refrigerating unit 12 and a pumping unit 13 thereon. The cabinet comprises the side walls 14, 15, the back wall 16, and the front wall 17. The front wall has a door opening therein, closed by a door 18 hinged, as at 19, in the usual manner. Each of these walls and the door comprises inner and outer wall members 21 and 23, see Fig. 3, spaced apart, and with a suitable insulation 24 between them.

The top wall 25 of the cabinet is provided with an opening 26, closed by a closure 27. Mounted within this opening, and supported therein, and extending downwardly into the interior of the cabinet, is a receptacle 28 for containing a cooling fluid, such as water, 29. This receptacle tapers downwardly for facilitating its insertion in the opening when assembling the apparatus. It is supported by laterally extending flanges around its upper edge that engage the marginal structure of the opening 26. These flanges are enveloped in insulation, as shown.

The expansion coils 31 of the refrigerating unit 12 are mounted in the receptacle 28, and the water contained in said receptacle is adapted, under certain conditions, to be congealed, as will presently appear. Mounted within the receptacle 28, and extending through the bottom thereof, are a plurality of castellated overflow ducts 32, and the lower ends of these ducts are provided with what may be termed nozzles 33 for spraying the cooling liquid when the same overflows the ducts. These ducts are of a height less than the depth of the receptacle, so that the cooling liquid will overflow the same when the pump 13 is operated. Castellation at the top of the ducts distributes the flow among the ducts when more than one duct is employed, and this evenness of distribution is important in event the user does not level the device properly.

Figure 3:
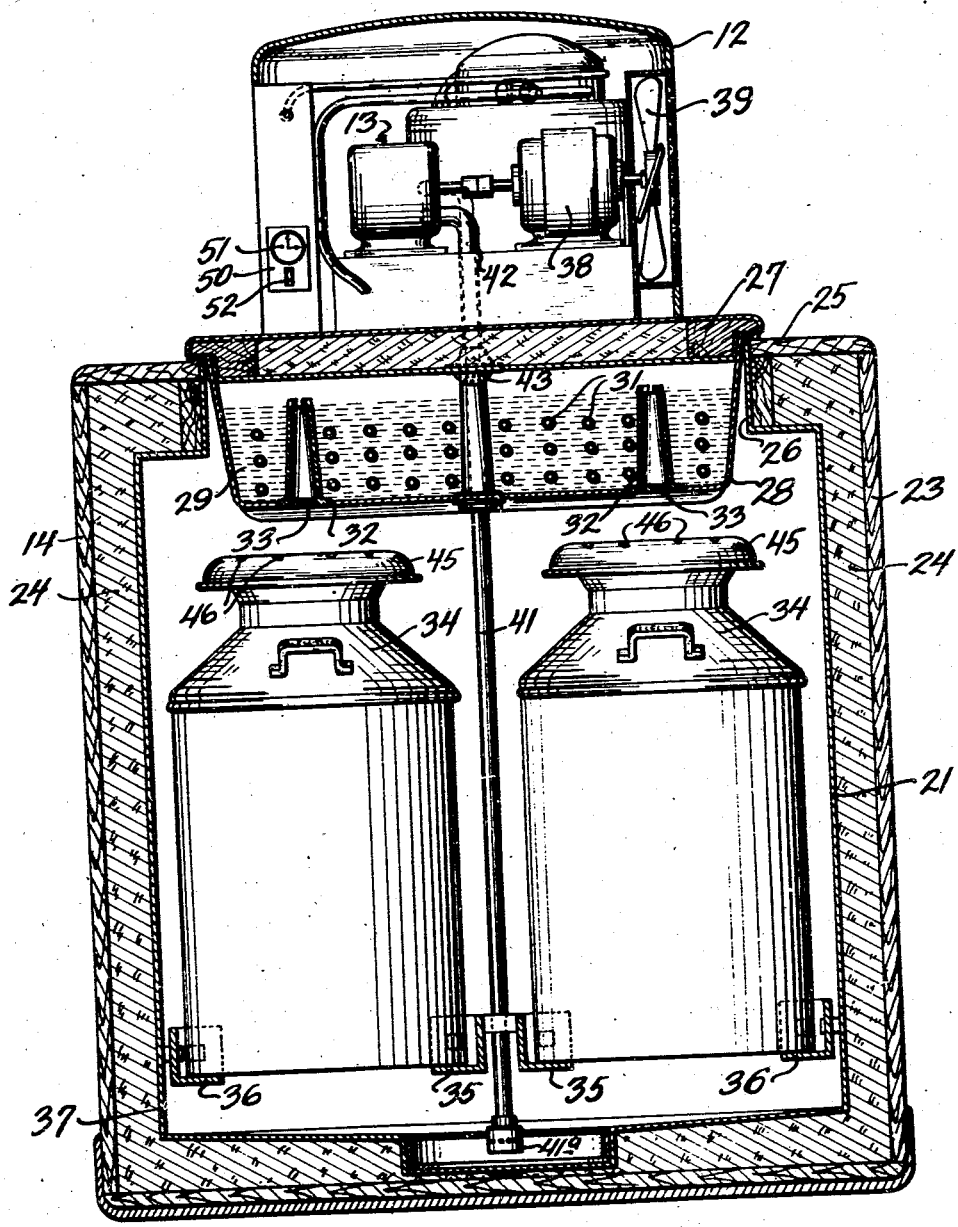
Fig. 3 is a vertical section of the apparatus during an intermediate period of its operation.

Suitable means are provided for supporting food containers, such, for instance, as milk cans 34, beneath these spray nozzles 33, respectively, as shown more clearly in Fig. 3 of the drawings. In the construction shown, which is by way of example only, angle bars 35, 36, in pairs facing each other, are provided, and each set of bars is adapted to support two of these receptacles. The cabinet may be increased or decreased for accommodating a greater or less number of cans, as requirements may dictate. The flanges of adjacent bars may be welded together at their forward ends and spaced apart at their rear ends so as to space the angles of each pair farther apart at their forward ends, so that the cans may be more easily inserted and removed from the cabinets. The bottom wall of the cabinet is provided with a reservoir 37 having a portion of its bottom wall depressed for forming a sump. The floor of the chamber is inclined toward the sump in order that the water, or other cooling liquid, discharged through the nozzles 33 will collect in the sump.

Suitable means are provided for transferring the liquid from the reservoir 37 to the receptacle 28. As shown, the pump 13 is employed for this purpose. The pump is operated by a suitable motor 38, and this motor also operates a fan 39 which is adapted to cool the condenser for the refrigerating unit 12, as is usual in such constructions. Since the refrigerating unit, the pump, and the motor for operating the pump are of the usual or any well known construction, it is not thought necessary to further illustrate or describe the same.

The suction line of the pump, which may be of the self-priming centrifugal type, is shown at 41, having a foot valve at 41ª within the depression or sump of the reservoir 37 and its discharge line at 42. The discharge line 42 is provided with a nozzle having a plurality of fine openings 43 which discharges the cooling fluid in a spray over the surface of the congealed water or other cooling fluid in the receptacle 28.

Since milk contains animal heat, and since heat and moisture are conducive to rapid bacterial growth, it is necessary immediately after the milking operation to cool the milk rapidly down to a predetermined temperature in order to materially retard this growth. It is during this rapid cooling operation that the peak loads for the refrigerator or cooling apparatus occur.

Assuming now that the liquid in the receptacle 28 is congealed and it is desired to cool four cans, 34, of freshly drawn milk. The cans of warm milk, with lids 45 on them, are slid in on the supports, as shown in Fig. 3, beneath the ducts 32, and the door closed. The refrigerator unit, if not already running, and the pump are both started. The refrigerating unit continues to cool the coils 31 and cooling chamber, and the pump elevates the water from the reservoir 37 and sprays it over the ice in the receptacle, and this water, in melting the ice, has its temperature greatly lowered. This cold water overflows the ducts 32, as shown in Fig. 4, and is sprayed on the tops of the lids 45, which are radially grooved, as at 46, to spread the flow evenly, and from there the cold water cascades to the cans and runs down the sides thereof. The cold water flowing down in direct contact with the metal of the cans effects a very rapid heat exchange and the milk is soon cooled, principally at the expense of the ice which is soon melted by absorbing heat indirectly from the milk. The refrigerating mechanism may continue to operate to assist in lowering the temperature of the milk.

The direct contact of the cooled water with the walls of the metal cans constitutes an excellent heat exchange relation resulting in a very rapid lowering of the temperature of the milk, and eliminates open air contamination. The absorption of heat required in melting the ice, together with the continued operation of the cooling unit during the cooling period, causes an extremely rapid reduction of temperature of the milk. This is considered an important feature of the invention.

The latent heat of fusion is such that only a comparatively small space for storage of ice is required in reducing the temperature of the milk, and consequently the refrigerating apparatus is not bulky. Since refrigeration may be said to be stored during a period of light loads to be utilized during peak loads for assisting in lowering of the temperature of the milk, it follows that the size of the cabinet and the capacity of the refrigerating unit may be reduced to a minimum.

In certain sections of the country the milk is collected by the buyer's truck only once each day, usually during the morning. In such an event the evening milk is cooled rapidly in the apparatus in the usual manner, and is left in the cabinet during the night. The ice may be all melted by the time this milk is cooled down to the required temperature, but once cooled it does not take so much cooling effect to maintain the milk at the desired temperature, and during the latter period the pump does not operate but ice is frozen in the receptacle by the refrigerating mechanism in readiness for rapidly cooling the morning milk. If desired, the evening milk may have its temperature further slightly reduced just before the cans are removed from the cabinet to make room for the morning milk, so that its temperature will not rise too high while the morning milk is being treated. The usual evening coolness assists in carrying this extra load, if this load otherwise happens to be critical.

The refrigerating unit is provided with a suitable temperature control for stopping and starting the refrigerating mechanism in response to the temperature requirements of the interior of the cabinet. This control may be adjusted as desired by the hand operated switch 30. The switch for the current for the refrigerator mechanism is shown at 40, and a switch for the pump is shown at 60. Since these switches and controls are common in the art, it is not thought necessary to further illustrate or describe the same.

If desired, a time control for the pump may also be provided. As shown, this time control 50 is provided with a chronometer 51, which may be set to close a circuit through the pump motor at any selected time in the morning and evening and open the circuit after a predetermined interval of time. For instance, the switch may be automatically closed at 6 a. m. and 6 p. m., and opened at 7 a. m. and 7 p. m. A manually operated switch 52 may also be provided for opening and closing the switch as desired. Since these control elements may be constructed conventionally, it is not deemed necessary to describe the same.

It will thus be seen that the fresh warm milk is rapidly cooled by the combined action of the refrigerating unit and the melting of ice, and that the ice is frozen between the milking periods when the load on the refrigerating unit is at its minimum. It will also be appreciated that during the period the unit is forming the ice the pump is not operating. During the ice forming period any article or food product that may be placed in the lower portion of the cabinet is cooled by convection of air within the cabinet, and for that reason the cooling liquid in the reservoir does not have its temperature reduced to the freezing point at any time during the operation of the apparatus.

While it is desirable that ice be frozen in the receptacle and that water be pumped from the reservoir to flow over the ice before flowing over the receptacles, it is understood that the water in the receptacle may have its temperature reduced below that of the lower portion of the cabinet but not to the freezing point, if desired, and be utilized in the same manner as though ice had formed. The cooling will, of course, not be as low nor as rapid as it would be where ice is formed. Furthermore, if it is desired that the water be used to wash the outside of the cans, the water can be changed as often as desired by the drain plugs 47.

It is thought from the foregoing, taken in connection with the accompanying drawings, that the operation and construction of my device will be apparent to those skilled in the art, and that changes in size, shape, proportion and details may be made without departing from the spirit and scope of the appended claims.

I claim as my invention:

1. A method of storing and utilizing refrigeration within a cabinet for cooling a product which comprises congealing a cooling liquid in a receptacle within the cabinet while maintaining said cabinet at a lowered temperature, then when an uncooled product is inserted within said cabinet spraying a liquid over said congealed liquid and said uncooled product for abstracting heat from said uncooled product, and simultaneously cooling said product by causing the air in said cabinet to circulate by convection, first across the container for the congealed liquid and then over the container for said product.

2. In an apparatus for cooling fresh milk comprising a cabinet, a refrigerating unit carried by said cabinet, a receptacle for containing congealed cooling fluid for said cabinet, expansion coils for said unit in said receptacle, metal containers for said milk, means beneath said receptacle for supporting said containers, said containers having closures provided with radially extending grooves, a reservoir in the lower portion of said cabinet for receiving cooling fluid from said receptacle, and manually controlled means for circulating said cooling fluid over the upper surface of said congealed cooling fluid in said receptacle, and means for spraying the cooling fluid from said receptacle over said closures for causing said fluid to flow through said grooves onto the sides of said containers for cooling the contents thereof.

3. A device for cooling food products comprising a cabinet for receiving containers having closures thereon, for transporting said products, said cabinet having a reservoir in its lower portion provided with a sump, means in said cabinet for supporting said containers within said cabinet in a predetermined position above said sump, a receptacle for containing a cooling liquid within said cabinet vertically above said containers, a refrigerating unit including an expansion coil within said receptacle for congealing said cooling liquid, a plurality of overflow ducts for said receptacles, one vertically above each of said containers, and opening upwardly into the receptacle with portions thereof extending above the top of said congealed liquid, a pump for pumping said cooling liquid from said sump and discharging the same onto the congealed liquid in said receptacle for causing the cooling liquid to overflow into said ducts onto said closures and containers for cooling the contents of said containers, said receptacle extending downwardly into the upper portion of said cabinet for cooling said containers by convection when said pump is not operating.

4. An apparatus for cooling products comprising a cabinet having a space for receiving one or more containers, means for removably supporting the same in said space, a receptacle above said space to store a cooling liquid in said cabinet, a reservoir below said space for catching said liquid overflowing from said receptacle, refrigerating mechanism for congealing said liquid in said receptacle, overflow ducts extending upwardly through the bottom wall of said receptacle and terminating below the plane which includes the upper edge of the receptacle walls, spray nozzles on the lower ends of said ducts for discharging said overflowing liquid over the upper ends of containers in said space, and means for returning said liquid from said reservoir to the receptacle and spraying the same over any congealed liquid present in said receptacle whereby said overflowing liquid will absorb heat from the contents of said containers and said returned liquid will have said absorbed heat removed from it prior to overflowing through said ducts again and contacting said containers to absorb further heat from the contents thereof, the location of said receptacle above the container receiving space causing convective circulation of the air within said cabinet to assist in the refrigeration of the contents of the containers.

5. In a cooling apparatus for rapidly cooling products within containers, the combination of a cabinet, a refrigerating system including a refrigerant liquefying unit and an evaporator connected to said unit, an apparatus cooperating with said system for producing a greater refrigerating effect per unit of time than can be produced by said system operated alone, said apparatus comprising means for supporting containers in a predetermined space in said cabinet, a receptacle in the upper portion of the cabinet above said space with said evaporator disposed in said receptacle, and means for spraying fluid liquid over liquid in the receptacle congealed by said evaporator and then over containers located in said space to extract heat from said containers, the arrangement being such that said containers are also cooled by natural convective flow of air in the cabinet over them and over the surface of said receptacle when the liquid is not spraying over the containers.

6. A method of lowering the temperature of an unchilled article by a secondary refrigerating effect greater per unit of time than the capacity of a refrigerating unit employed as a primary source of refrigeration which includes the steps of congealing a portion of a predetermined supply of cooling liquid during the time the apparatus is maintaining an already chilled article at a reduced temperature and subsequently spraying the uncongealed portion of said liquid over said congealed portion and over said unchilled article for rapidly reducing the temperature of said unchilled article, and simultaneously assisting in cooling said unchilled article by causing the air in said cabinet to circulate, in heat exchange relation with the congealed liquid and with said article.

7. In a refrigerating apparatus, a cabinet, a refrigerating unit for said cabinet including expansion coils within said cabinet, a receptacle for holding a congealable liquid around said coils for forming a mass of ice in said receptacle, means for supporting metal containers within said cabinet beneath said receptacle, means for circulating water over said ice for melting the same to form ice water and for spraying such water over the top of said containers for rapidly reducing the temperature of the contents of said containers, and means for automatically removing said water circulating means from operation at a predetermined time after the start of its operation.

8. In an apparatus for cooling a product, a cabinet, a receptacle in the upper portion of said cabinet in which water may be stored, means for freezing said stored water, means for supporting containers having closures on their upper ends within said cabinet beneath said receptacle, and means for circulating water over the upper surface of said frozen water and for spraying the same onto said closure for said containers for rapidly reducing the temperature of the contents of said containers.

9. In a refrigerating apparatus for cooling a product comprising a cabinet, means for supporting said product in a predetermined position in the lower portion of said cabinet, a refrigerating unit including means for storing and freezing a mass of water in the upper portion of said cabinet vertically above said position for maintaining said cabinet at a reduced temperature, means for causing a liquid to flow over said ice to be chilled by and to progressively melt the same, and means for discharging said liquid and ice water over said product for rapidly reducing the temperature thereof.

10. In an apparatus for rapidly lowering the temperature of freshly drawn milk having a cabinet and a refrigerating system therein including a refrigerant liquefying unit and an evaporator connected to said unit, the combination of an apparatus arranged to cooperate with said system for producing a greater refrigerating effect per unit of time than can be produced by said system when operating alone, a receptacle extending downwardly in the upper portion of said cabinet for holding a cooling medium around the evaporator for cooling the interior of said cabinet and for storing the refrigerating effect in said receptacle between milking times at a maximum rate which is below that required for rapidly cooling the freshly drawn milk, means for supporting a plurality of containers vertically below said receptacle, an overflow stand pipe with a spray in its lower end for each container within said receptacle for spraying the cooling medium onto the tops and sides of said containers, a pump for transferring said cooling medium after it flows over said containers back to said receptacle, the arrangement being such that said containers may be cooled by convective circulation of air so long as said receptacle contains the stored refrigerating effect.

ALEXANDER F. McMAHON.